United States Patent
Yi et al.

(10) Patent No.: US 9,054,360 B2
(45) Date of Patent: Jun. 9, 2015

(54) INTEGRATED HIGH-VOLTAGE BATTERY CASE

(75) Inventors: Gyu Ho Yi, Gyeonggi-do (KR); Sun Hyung Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 205 days.

(21) Appl. No.: 13/163,898

(22) Filed: Jun. 20, 2011

(65) Prior Publication Data

US 2012/0129029 A1     May 24, 2012

(30) Foreign Application Priority Data

Nov. 24, 2010 (KR) .................. 10-2010-0117209

(51) Int. Cl.
    *H01M 2/10*       (2006.01)
    *B60K 1/04*       (2006.01)

(52) U.S. Cl.
    CPC .............. *H01M 2/1083* (2013.01); *H01M 2/10* (2013.01); *H01M 2/1077* (2013.01); *B60K 1/04* (2013.01); *B60K 2001/0438* (2013.01); *B60Y 2306/01* (2013.01)

(58) Field of Classification Search
    None
    See application file for complete search history.

(56) References Cited

U.S. PATENT DOCUMENTS

| 5,390,754 A | * | 2/1995 | Masuyama et al. ........... 180/68.5 |
| 7,128,999 B1 | * | 10/2006 | Martin et al. ................... 429/99 |
| 2010/0092849 A1 | * | 4/2010 | Wood et al. ..................... 429/99 |

FOREIGN PATENT DOCUMENTS

| EP | 1939025 A1 | 7/2008 |
| JP | 58-80311 U | 5/1983 |
| JP | 2-109718 U | 9/1990 |
| JP | 07-081431 A | 3/1995 |
| JP | 10-129277 A | 5/1998 |
| JP | 2000-085375 A | 3/2000 |
| JP | 2009238643 A | 10/2009 |
| JP | 2010-238460 A | 10/2010 |
| KR | 10-2002-0044684 | 6/2002 |
| KR | 10-2008-0102799 | 11/2008 |

OTHER PUBLICATIONS

Partial English Translation of JP Office Action for U.S. Appl. No. 13/168,898 (Mar. 3, 2015).*

* cited by examiner

*Primary Examiner* — Milton I Cano
*Assistant Examiner* — Carmen Lyles-Irving
(74) *Attorney, Agent, or Firm* — Mintz Levin Cohn Ferris Glovsky and Popeo, P.C.; Peter F. Corless (57) ABSTRACT

The present invention relates to an integrated high-voltage battery housing. More particularly, it relates to an integrated high-voltage battery housing adapted to secure safety against side impact collisions while reducing the weight of a vehicle by integrating a connecting structure between a battery housing and a side member of a chassis of the vehicle. In particular, the integrated high-voltage battery housing includes: a bottom housing configured to receive a battery; a battery fixing bracket configured to fix the battery to a top surface of the bottom housing; and a plurality of flanges extending from an upper end edge of a side wall of the bottom housing and each having a coupling aperture for coupling the flange to a chassis side member. A protruding reinforcing portion extends transversely between opposite sides of the bottom housing on a bottom surface of the bottom housing.

8 Claims, 7 Drawing Sheets

RELATED ART

FIG.8

RELATED ART

INTEGRATED HIGH-VOLTAGE BATTERY CASE

CROSS-REFERENCE TO RELATED APPLICATION

This application claims under 35 U.S.C. §119(a) the benefit of Korean Patent Application No. 10-2010-0117209 filed Nov. 24, 2010, the entire contents of which are incorporated herein by reference.

BACKGROUND (a) Technical Field

The present invention relates to an integrated high-voltage battery housing. More particularly, it relates to an integrated high-voltage battery housing adapted to secure safety against side collisions while reducing the weight of a vehicle by integrating a connecting structure between a battery housing and a side member of a chassis of the vehicle.

(b) Background Art

A hybrid vehicle refers to a vehicle driven by two or more types of power combined with efficiency, where a driving power is generally obtained by combining a driving power of an engine using fuel and electric power of an electric motor having a high-voltage battery. Such a vehicle is also called as a hybrid electric vehicle (HEV).

Figure 6:
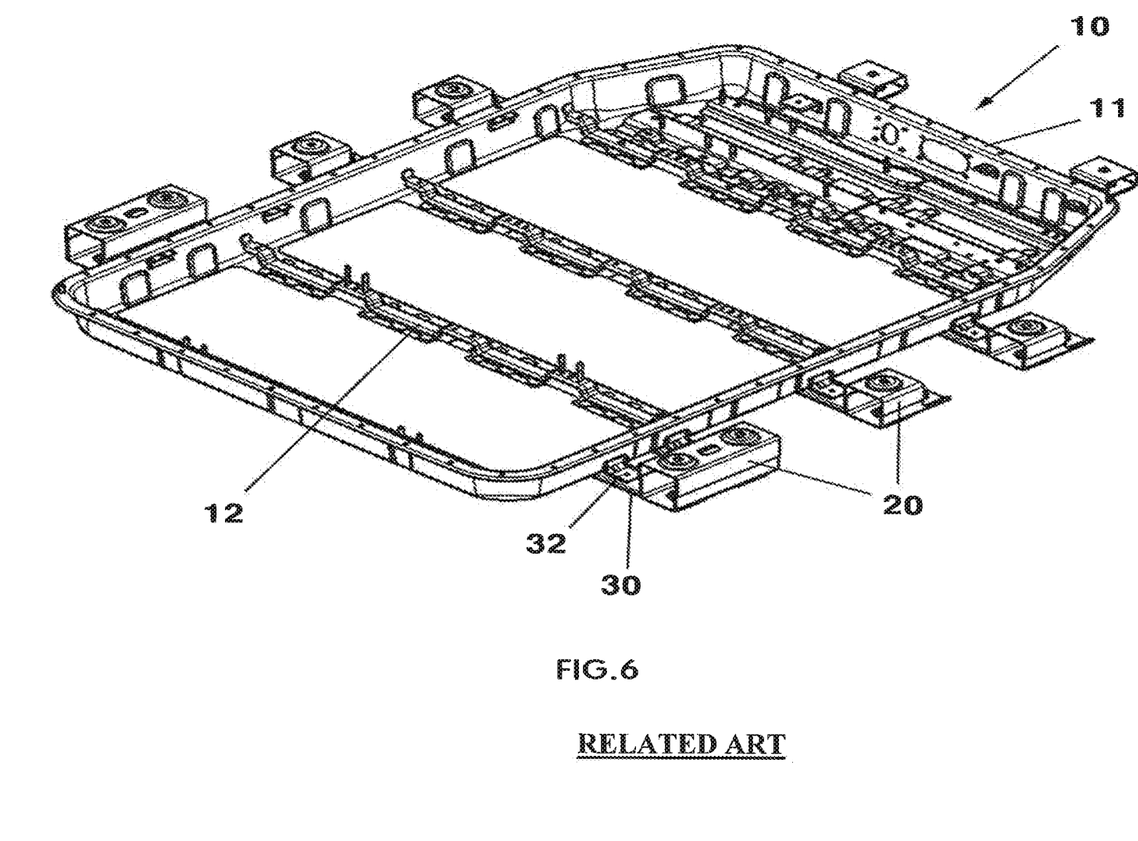
FIG. 6 is a top perspective view of an exemplary conventional high-voltage battery housing.
Figure 7:
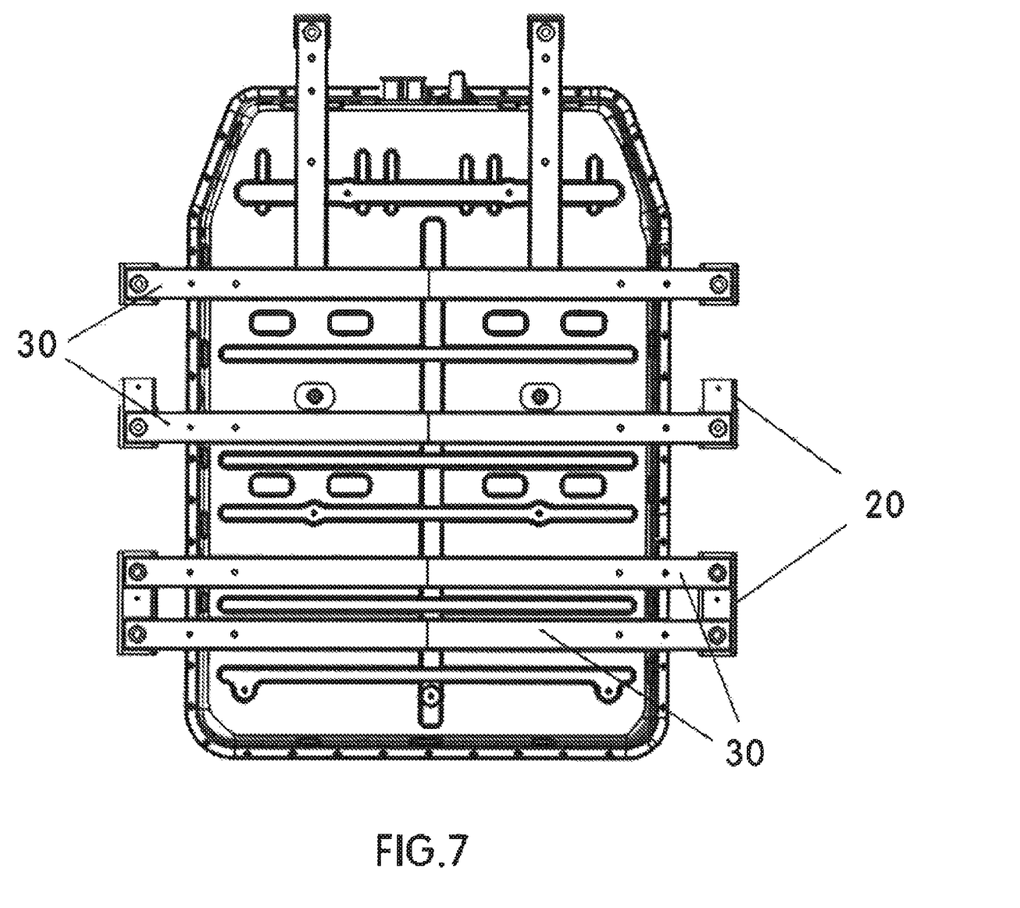
FIG. 7 is a bottom perspective view of the exemplary conventional high-voltage battery housing.
Figure 8:
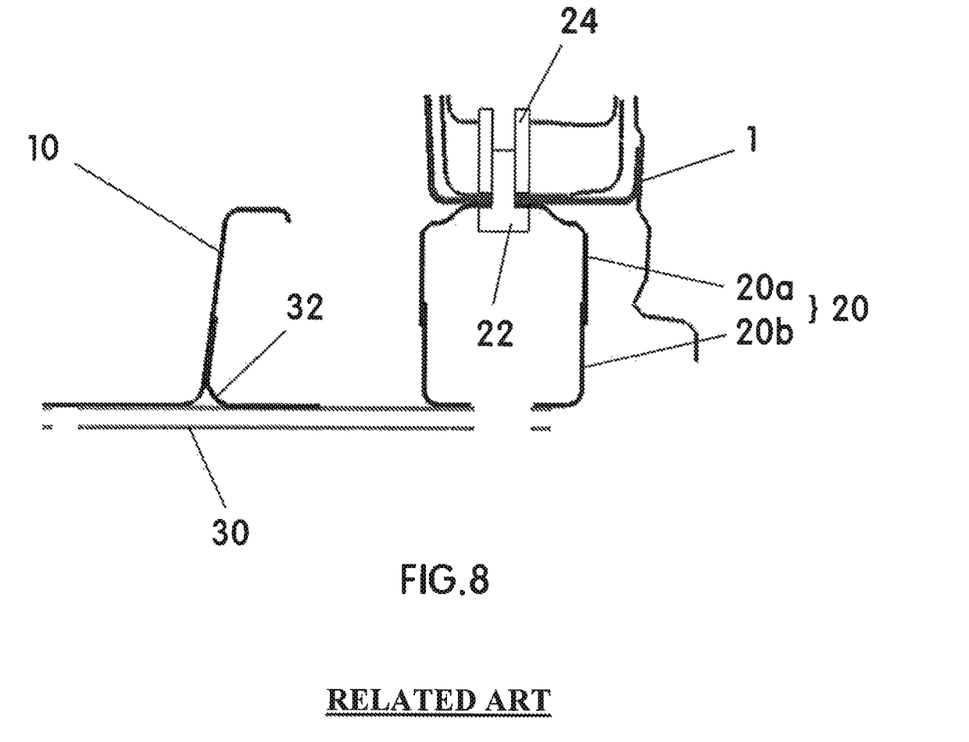
FIG. 8 is a sectional view illustrating a side portion of the exemplary conventional high-voltage batter case.

FIGS. 6 and 7 illustrate a conventional structure of a battery housing 10 for fixing a high-voltage battery to the interior of a chassis of a vehicle. FIG. 6 shows a top perspective view of the conventional high-voltage battery housing 10. FIG. 7 shows a bottom perspective view of FIG. 6. FIG. 8 shows a cross-section of a side portion of the conventional high-voltage battery housing 10.

As illustrated in the figures, the conventional high-voltage battery housing 10 includes a bottom housing 11 for loading a high-voltage battery and a plurality of battery fixing brackets 12 mounted to the interior of the bottom housing 11 that are configured in a way which fixes the high-voltage battery to the housing 11. Additionally, the housing 11 also includes side fixing brackets 20 coupled to a chassis side member 1 (as shown in FIG. 8) at a side portion of the bottom housing 11 in order to fix the bottom of the housing 11 to the chassis side member 1. A cross member 30 is also provided on the bottom surface of the to bottom housing 11 in the form of a bar and is configured to support the associated with the load of the high-voltage battery housing.

The cross member 30 extends to opposite sides of the bottom housing 11 to be coupled to the side fixing brackets 20 and is coupled to the chassis side bracket 1 through the side fixing brackets 20.

Referring to FIG. 8, the side fixing bracket 20 may be formed by welding a top bracket 20a and a bottom bracket 20b, where the bottom bracket 20b is coupled to the cross member 30 while the top bracket 20a is coupled to the chassis side member 1 through engagement of a bolt 22 screw-coupled to a aperture formed on a top surface of the top bracket 20a and a pipe nut 24.

Bottom housing connecting brackets 32 may be provided between one or more side walls of the bottom housing 11 and the cross member 30 to prevent distortion of the bottom housing 11 and to firmly fix the bottom housing 11 further.

However, the high-voltage battery housing has the disadvantages as follows.

First, a space is formed between a side wall of the bottom housing 11 and the side fixing bracket 20, which are separate parts, where a battery and a chassis are easily deformed and damaged during a side collision of the vehicle. That is, an impact on the battery housing 10 cannot be effectively distributed and the side fixing bracket 20 may be introduced into the battery housing 10 during a side collision of the vehicle, causing serious damage to a to battery cell within the housing. Furthermore, the support force of the side fixing bracket 20 supported by the cross member 30 of a bar type is not strong enough to prevent deformation of the chassis side member 1, thus, causing the chassis side member 1 to be vulnerable to an impact.

Second, the cross member 30 configured to supporting the bottom surface of the bottom housing 11 increases weight and the number of parts, considering the support force for the battery housing 10, i.e., the strength effect against a collision of the vehicle. This results in an increase in vehicle weight as well as the cost for the parts.

SUMMARY OF THE DISCLOSURE

The present invention relates to an integrated high-voltage battery housing adapted to be coupled to a chassis side member to minimize deformation of and damage to a battery and a chassis during a side impact collision of a vehicle.

It is another object of the present invention to provide an integrated high-voltage battery base that is adapted to effectively transfer a support force of a battery housing through an integrated structure and to reduce weight and manufacturing costs by reducing the number of parts required.

In one aspect, the present invention provides an integrated high-voltage battery housing which includes a bottom housing configured to receive a battery; a battery fixing bracket configured to fix the battery to a top surface of the bottom housing; and a plurality of flanges extending from an upper end edge of a side wall of the bottom housing. More specifically, each of the flanges may have a coupling aperture for coupling the flange to a chassis side member. A protruding reinforcing portion may also extend transversely between opposite sides of the bottom housing on a bottom surface of the bottom housing.

In some embodiments of the present invention, the reinforcing portion may be formed transversely between the flanges formed on opposite sides of the bottom housing to face each other. Also, the battery fixing bracket may have a bar-like shape extending to opposite sides of the bottom housing and having an upwardly protruding protrusion and the protrusion of the battery fixing bracket may face the protrusion of the reinforcing portion.

Furthermore in some embodiments of the present invention, the integrated high-voltage battery housing may further include a support bracket in which opposite ends are coupled to a side portion of the bottom surface of the bottom housing and the flange such that the support bracket is bent. The integrated high-voltage battery housing may further include a support plate disposed in a position where the coupling aperture of the flange is formed.

Advantageously, an impact transferred during a side collision of a vehicle can be efficiently distributed, thereby minimizing damage to a battery cell in the battery housing. Further, a chassis side member is firmly supported by the integrated high-voltage battery housing according to the illustrated embodiment of the present invention, thereby minimizing deformation of the chassis created during a side impact collision of the vehicle.

In addition, by eliminating the cross member and the side fixing bracket as is used in the conventional high-voltage battery housing, the weight of the battery housing is reduced thereby lowering manufacturing costs. Furthermore, the support bracket and the support plate according to the embodiment of the present invention help to enhance the support force of the battery housing and the strength of the flange.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter, exemplary embodiments of the present invention will be described below in detail with reference to the accompanying drawings such that those skilled in the art to which the present invention pertains can easily practice the present invention.

In particular, the integrated high-voltage battery housing includes: a housing configured to receive a battery; a bracket configured to fix the battery to a top surface of the housing; and a plurality of flanges extending from an upper end edge of a side wall of the housing and each having a coupling aperture for coupling the flange to a chassis. A protruding reinforcing portion may also extend transversely between opposite sides of the housing on a bottom surface of the housing.

Figure 1:
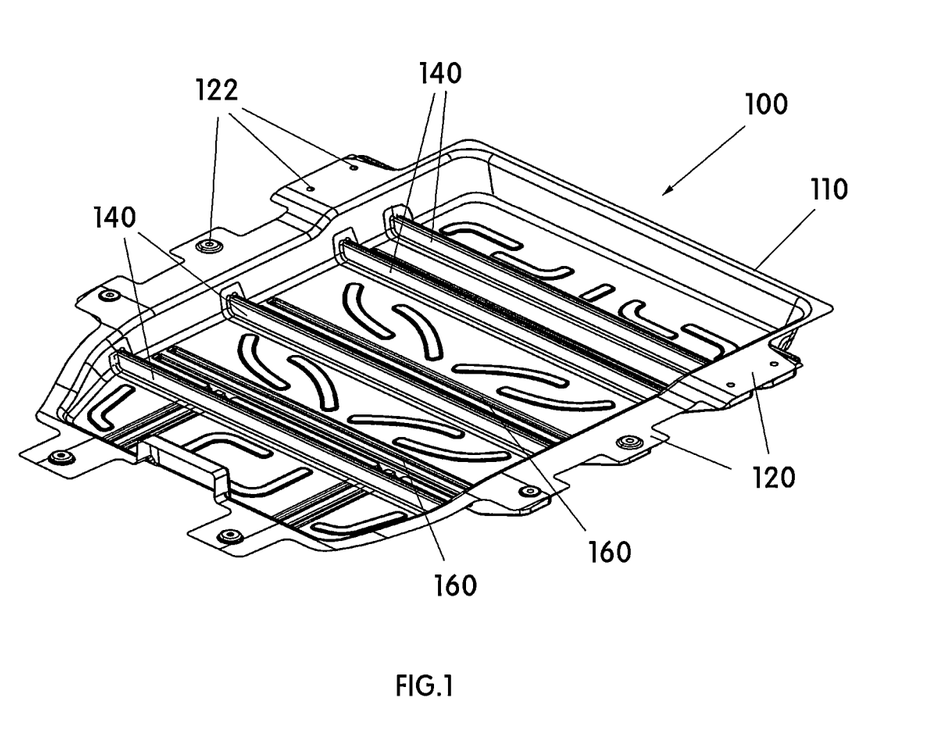
FIG. 1 is a top perspective view of an integrated high-voltage battery housing according to an exemplary embodiment of the present invention.
Figure 2:
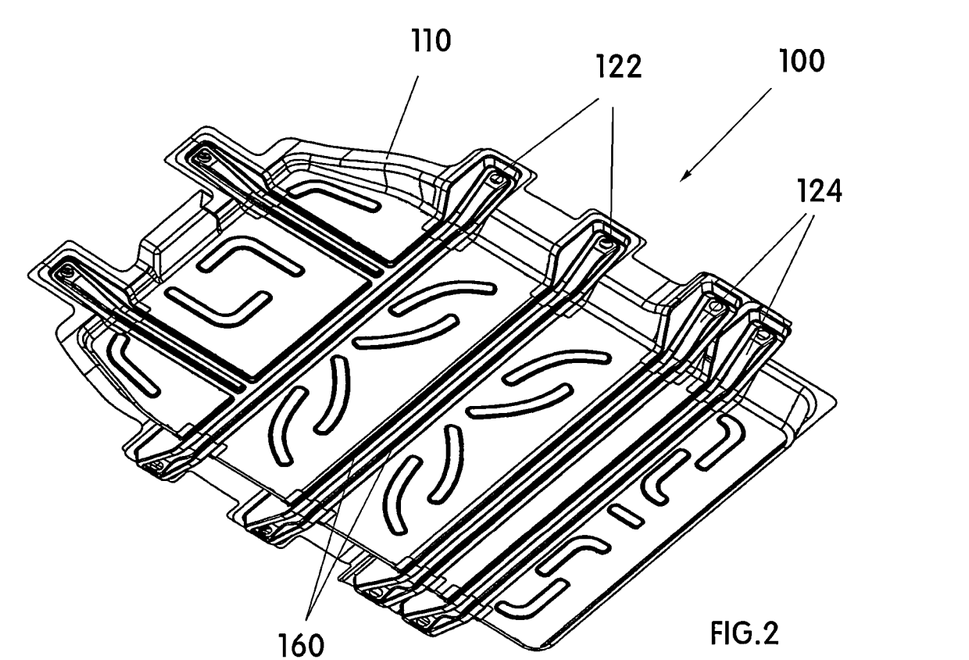
FIG. 2 is a bottom perspective view of the integrated high-voltage battery housing according to the exemplary embodiment of the present invention.

FIGS. 1 and 2 illustrate an integrated high-voltage battery housing 100 according to an exemplary embodiment of the present invention. FIG. 1 is a top perspective view of the high-voltage battery housing 100 and FIG. 2 is a bottom perspective view of the high-voltage battery housing 100.

As illustrated in the figures, the integrated high-voltage battery housing 100 according to the exemplary embodiment of the present invention includes a bottom housing 110, a battery fixing bracket 140, a flange 120, and a reinforcing portion 160.

The bottom housing 110 forms a space for receiving a battery, and the battery fixing brackets 140, for fixing the battery, are mounted to a top surface of the bottom housing 110. Accordingly, a plurality of battery fixing brackets 140 may be disposed in parallel at a certain spatial interval in order to mount a plurality of different types of batteries.

In the exemplary embodiment of the present invention, the flange 120 extends from a side wall of the bottom housing 110, and coupling apertures 122, for coupling to a chassis side member, is formed in the flange 120. In more detail, the flange 120 extends from the end of the top edge of the bottom housing 110, so that a plurality of flanges 120 may be formed along a perimeter of a side wall of the bottom housing 110. The flanges 120 may be symmetrically formed on opposite sides of the bottom housing 110, but the present invention is not limited thereto.

In the exemplary embodiments of the present invention, a protruding reinforcing portion 160, extending to opposite sides of the bottom housing 110 so as to cross the bottom housing 110, is formed on the bottom surface of the bottom housing 110. The reinforcing portion 160 is formed by bending the bottom surface of the bottom housing 110 in order to prevent distortion and deflection of the bottom surface of the bottom housing 110 and enhance the strength and support force thereof. According to the exemplary embodiment of the present invention, the cross-section of the reinforcing portion 160 may also have a protrusion, e.g., a U-like shape, protruding downward from the bottom surface of the bottom housing 110. In which case, a plurality of reinforcing portions 160 may be disposed in parallel at a certain spatial interval to enhance the support force of the bottom housing 110.

According to the illustrative embodiment of the present invention, when a pair of flanges 120 is symmetrically formed on opposite sides of the bottom housing 110, the reinforcing portion 160 may be transversely formed between the flanges 120. This structure effectively prevents distortion and deflection of the bottom housing 110 against a load of the battery housing 110 transferred to the flange 120 when the load is supported by the flanges 120.

Meanwhile, according to another embodiment of the present invention, the battery fixing bracket mounted to the top surface of the bottom housing 110 may be in the form of a bar extending between opposite sides of the bottom housing 110, and may also have an upwardly protruding structure. That is, the cross-section of the battery fixing bracket 140 may have a protrusion, e.g., an inversed U-like shape, to prevent distortion and deflection of the bottom housing 110 together with the reinforcing portion 160 formed on the bottom surface of the bottom housing 110.

Figure 5:
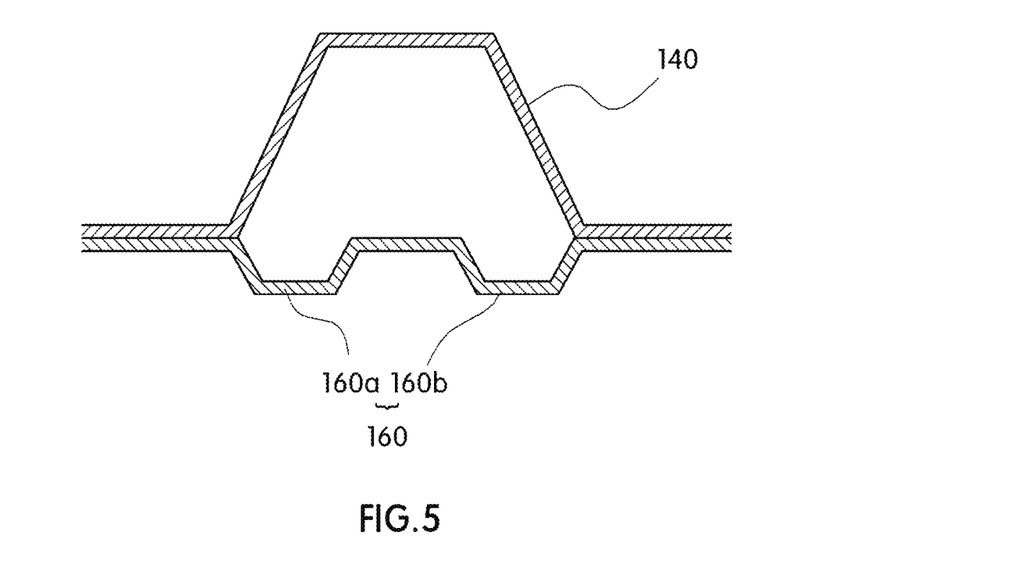
FIG. 5 is a sectional view illustrating a battery fixing bracket and a reinforcing portion formed opposite to each other according the exemplary embodiment of the present invention.

More particularly, as illustrated in FIG. 5, the protrusion of the battery fixing bracket 140 and the protrusion of the reinforcing portion 160 may be formed opposite to each other. Accordingly, the bottom housing 110 of the present invention is prevented from being deformed in an upward direction and a downward direction with respect to the battery fixing bracket 140 which transfers the load of a battery cell, thereby maximizing the strength and support force thereof. Then, according to the exemplary illustrative embodiment of the present invention, one battery fixing bracket 140 may face the pair of reinforcing portions, e.g., groves or troughs, 160a and 160b to maximize the support force thereof, in which case the protrusions of the battery fixing bracket 140 may form a pair in order to be properly deformed.

Figure 3:
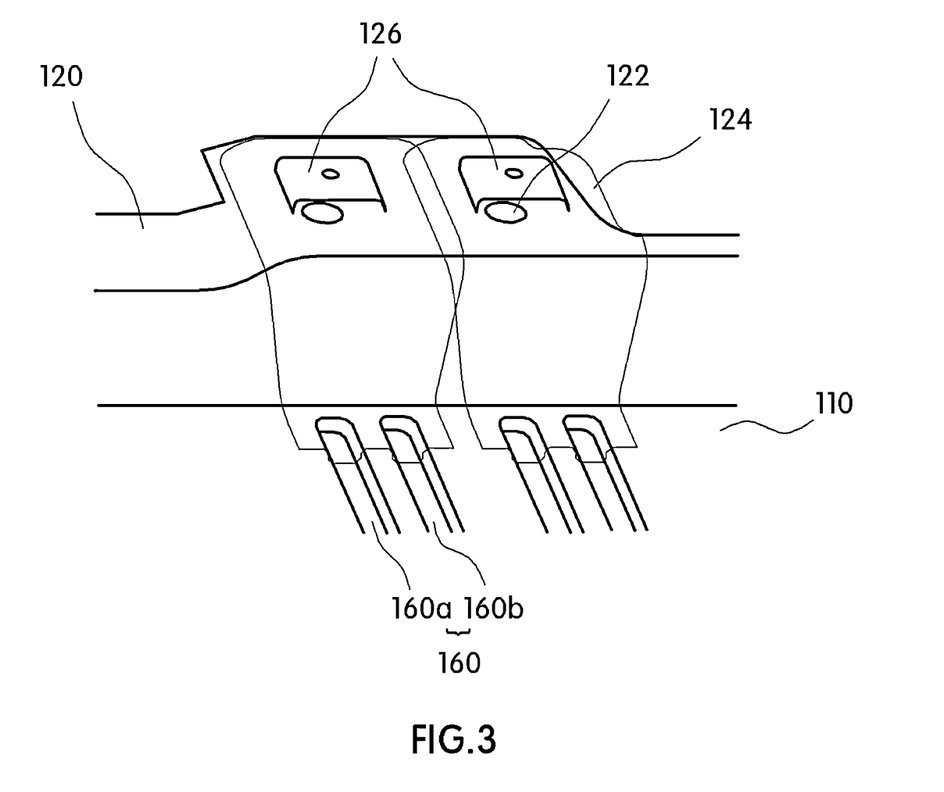
FIG. 3 is a perspective view illustrating a side portion of the integrated high-voltage battery housing according to the exemplary embodiment of the present invention.
Figure 4:
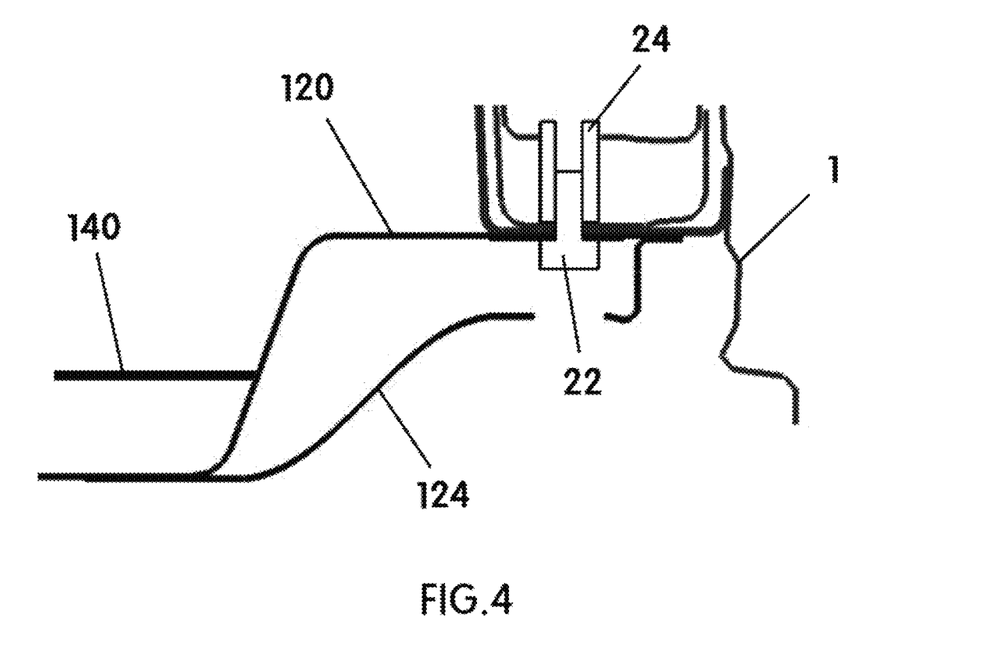
FIG. 4 is a sectional view illustrating a side portion of the integrated high-voltage battery housing according to the exemplary embodiment of the present invention.

Meanwhile, the integrated high-voltage battery housing 100 according to the exemplary illustrative embodiment of the present invention may further include a support bracket 124 and a support plate 126 for supporting and strengthening the flange 120 to which a load of the high-voltage battery housing 100 is transferred.

FIGS. 3 and 4 illustrate a side portion of the integrated high-voltage battery housing according to the embodiment of the present invention.

FIG. 3 illustrates an exemplary support bracket 124 having opposite ends of which are coupled to a side portion of the bottom surface of the bottom housing 110 and the flange 120. The flange 120 may extend from the end of the top edge of a side wall of the bottom housing 110 wherein a step formation may be formed between the flange 120 and the bottom surface of the bottom housing 110. Thus in this embodiment of the present invention, the support bracket 124 has a curved structure, opposite ends of which are coupled to the flange 120 and the bottom surface of the bottom housing 110 respectively.

The support bracket 124 maintains strength between the flange 120, to which an upward force is applied, and the bottom surface of the bottom housing 110, to which a load is applied downward to prevent deformation such as deflection of a side wall of the bottom housing 110. In some embodiments of the present invention, one end of the support bracket 124 may be coupled to a portion of the flange 120 where the coupling apertures 122 are formed in order to maximize support force.

As illustrated in FIG. 4, the coupling apertures 122 formed in the flange 120 are formed in order to couple the chassis side member 1 and may be fixed to a chassis side member 1 through engagement of a bolt 22 screw-coupled to a coupling aperture 122 and a pipe nut 24. Additionally, the integrated high-voltage battery housing 100 may further include a support plate for enhancing the strength and support force of the flange 120 in a position where the coupling apertures 122 of the flange 120 are formed. That is, the support plate 126 may be bonded to the flange 120 around the coupling apertures 122 to which a bolt 22 is screw-coupled to prevent deformation such as distortion of the flange 120 by reinforcing the strength of the flange 120.

The integrated high-voltage battery housing 100 according to the embodiment of the present invention is coupled to the chassis side member 1 through the flange 120 extending from the bottom housing 110 such that the high-voltage battery housing 100 can be fixed and supported in an integrated structure using the protruding reinforcing portion 160 formed on the bottom surface of the bottom housing 110 to maintain the support force of the bottom housing 110.

Advantageously, the flange 120 integrally formed with the bottom housing 110 effectively disperses an impact generated during a side impact collision of the vehicle to a side wall of the bottom housing 110, thereby minimizing deformation of the battery housing 100 and damage to the battery cell. Moreover, when the integrated high-voltage battery housing 100 according to the present invention is mounted to the chassis side member 1, the chassis side member 1 is firmly fixed by the flange portion 120 integrally formed with the bottom housing 110, thus minimizing deformation of the chassis created during a side collision of the vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. Further, many modifications may be made to specific situations and materials without departing from the essence of the invention. Therefore, the present invention is not limited to the detailed description of the preferred embodiments but include all embodiments within the scope of the attached claims.

What is claimed is:

1. An integrated high-voltage battery housing comprising:
   a bottom housing configured to receive a battery;
   a battery fixing bracket configured to fix the battery to a top surface of the bottom housing; and
   a plurality of flanges extending from an upper end edge of a side wall of the bottom housing, each flange having a coupling aperture allowing the flange to be coupled to a chassis side member,
   wherein a protruding reinforcing portion extends transversely between opposite sides of the bottom housing on a bottom surface of the bottom housing, and is formed as a depression in the bottom surface of the bottom housing,
   wherein the battery fixing bracket has a bar-like shape that extends to opposite sides of the bottom housing and has an upwardly protruding protrusion,
   wherein the protrusion of the battery fixing bracket is disposed directly above the protrusion of the reinforcing portion,
   wherein the protrusion of the battery fixing bracket is overlapped with the protrusion of the reinforcing portion to form a space therebetween.

2. The integrated high-voltage battery housing of claim 1, wherein the reinforcing portion is formed transversely between the flanges formed on opposite sides of the bottom housing to face each other.

3. The integrated high-voltage battery housing of claim 1, further comprising a support bracket, opposite ends of which are coupled to a side portion of the bottom surface of the bottom housing and the flange such that the support bracket is bent.

4. The integrated high-voltage battery housing of claim 1, further comprising a support plate disposed in a position where the coupling aperture of the flange is formed.

5. An integrated high-voltage battery housing comprising:
   a housing configured to receive a battery;
   a bracket configured to fix the battery to a top surface of the housing; and
   a plurality of flanges extending from an upper end edge of a side wall of the housing, each flange having an aperture allowing the flange to be coupled to a chassis,
   wherein a protruding reinforcing portion extends transversely between opposite sides of the housing on a bottom surface of the housing, and is formed as a depression in the bottom surface of the bottom housing
   wherein the bracket has a bar-like shape that extends to opposite sides of the housing and has an upwardly protruding protrusion,
   wherein the protrusion of the bracket is disposed directly above the protrusion of the reinforcing portion,
   wherein the protrusion of the battery fixing bracket is overlapped with the protrusion of the reinforcing portion to form a space therebetween.

6. The integrated high-voltage battery housing of claim 5, wherein the reinforcing portion is formed transversely between the flanges formed on opposite sides of the housing to face each other.

7. The integrated high-voltage battery housing of claim 5, further comprising a support bracket, opposite ends of which are coupled to a side portion of the bottom surface of the bottom housing and the flange formed such that the support bracket is bent.

8. The integrated high-voltage battery housing of claim 5, further comprising a support plate disposed in a position where the coupling aperture of the flange is formed.

* * * * *